United States Patent
Lee et al.

(10) Patent No.: US 9,761,864 B2
(45) Date of Patent: Sep. 12, 2017

(54) CATHODE ACTIVE MATERIAL FOR HIGH VOLTAGE LITHIUM SECONDARY BATTERY AND LITHIUM SECONDARY BATTERY INCLUDING THE SAME

(71) Applicant: LG Chem, Ltd., Seoul (KR)

(72) Inventors: Hyeokmoo Lee, Daejeon (KR); Jae Hyun Lee, Daejeon (KR); Su Rim Lee, Daejeon (KR); Song Taek Oh, Daejeon (KR); JungSeok Choi, Daejeon (KR); Ji Hye Park, Daejeon (KR)

(73) Assignee: LG Chem, Ltd. (KR)

( * ) Notice: Subject to any disclaimer, the term of this patent is extended or adjusted under 35 U.S.C. 154(b) by 178 days.

(21) Appl. No.: 14/495,015

(22) Filed: Sep. 24, 2014

(65) Prior Publication Data

US 2015/0090925 A1  Apr. 2, 2015

(30) Foreign Application Priority Data

Sep. 30, 2013  (KR) .................. 10-2013-0116402

(51) Int. Cl.
| | |
|---|---|
| H01M 4/131 | (2010.01) |
| H01M 4/505 | (2010.01) |
| H01M 4/525 | (2010.01) |
| H01M 4/1315 | (2010.01) |
| H01M 4/02 | (2006.01) |

(52) U.S. Cl.
CPC .......... *H01M 4/131* (2013.01); *H01M 4/505* (2013.01); *H01M 4/525* (2013.01); *H01M 4/1315* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 6,872,491 B2 * | 3/2005 | Kanai | ...................... H01M 4/40 429/221 |
| 2002/0055042 A1 | 5/2002 | Kweon et al. | |
| 2007/0037056 A1 | 2/2007 | Kitao et al. | |
| 2011/0171529 A1 * | 7/2011 | Kono | .................. H01M 4/0471 429/223 |
| 2011/0315918 A1 * | 12/2011 | Kawai | ................... H01M 4/505 252/182.1 |
| 2012/0141873 A1 * | 6/2012 | Kim | ..................... H01M 4/131 429/220 |
| 2012/0248388 A1 * | 10/2012 | Nagai | ................... H01M 4/505 252/519.15 |
| 2013/0236780 A1 * | 9/2013 | Yokote | ................. H01M 4/485 429/211 |

FOREIGN PATENT DOCUMENTS

| | | |
|---|---|---|
| KR | 20100042145 A | 4/2010 |
| KR | 20130001703 A | 1/2013 |

OTHER PUBLICATIONS

Doeff, Marca M. "Battery Cathodes", Chapter 2 in Batteries for Sustainability, pp. 5-49, dated Nov. 28, 2012, published by Springer New York; attached to the case file as a PDF.
Yoshio, Masaki, et al., "Preparation and properties of LiCoyMnxNi1—x—yO2 as a cathode for lithium ion batteries." Journal of Power Sources, vol. 90 (2000), ppl. 176-181.

* cited by examiner

*Primary Examiner* — Katie L Hammer
(74) *Attorney, Agent, or Firm* — Lerner, David, Littenberg, Krumholz & Mentlik, LLP

(57) ABSTRACT

Disclosed are a cathode active material for high voltage lithium secondary batteries and a lithium secondary battery including the same and, more particularly, the present invention relates to a cathode active material for lithium secondary batteries that includes a lithium transition metal oxide having a lithium molar fraction of greater than 1, containing a relative excess of nickel, and having a composition represented by Formula 1 below, wherein the lithium transition metal oxide has a $Li_2MnO_3$-like structure phase:

$$Li_{1+a}Ni_bCo_cMn_{1-(a+b+c+d)}M_dO_{2-t}A_t \quad (1)$$

wherein $0.05 \leq a \leq 0.2$, $0.4 \leq b \leq 0.7$, $0.1 \leq c \leq 0.4$, $0 \leq d \leq 0.1$, and $0 \leq t < 0.2$;

M is at least one divalent or trivalent metal; and
A is at least one monovalent or divalent anion.

9 Claims, No Drawings

CATHODE ACTIVE MATERIAL FOR HIGH VOLTAGE LITHIUM SECONDARY BATTERY AND LITHIUM SECONDARY BATTERY INCLUDING THE SAME

CROSS-REFERENCE TO RELATED APPLICATIONS

The present application claims priority from Korean Patent Application No. 10-2013-0116402 filed Sep. 30, 2013, the disclosure of which is hereby incorporated herein by reference.

TECHNICAL FIELD

The present invention relates to a cathode active material for high voltage lithium secondary batteries and a lithium secondary battery including the same and, more particularly, to a cathode active material for high voltage lithium secondary batteries that includes a lithium transition metal oxide having a particular composition and a lithium secondary battery including the same.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

As cathode active materials for lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure, and the like and lithium-containing nickel oxides such as $LiNiO_2$ is also under consideration.

Among these cathode active materials, $LiCoO_2$ is widely used due to excellent lifespan characteristics and charge and discharge efficiencies. However, $LiCoO_2$ is low in safety at high temperature and expensive due to resource limitations of cobalt as a raw material and thus there is limitation in price competitiveness.

Lithium manganese oxides, such as $LiMnO_2$, $LiMnO_4$, and the like, are advantageous in that they have high thermal safety and are inexpensive and easy to synthesize. However, such lithium manganese oxides have low capacity, poor high-temperature characteristics, and low conductivity.

Meanwhile, among lithium-containing manganese oxides such as $LiMnO_2$, $LiMn_2O_4$, and $Li_2MnO_3$ formed through overlithiation of a lithium manganese oxide, $Li_2MnO_3$ has very high structural stability while being electrochemically inactive and thus is not suitable for use as a cathode active material for secondary batteries. Thus, the related art discloses a technology of using, as a cathode active material, a solid solution formed using $Li_2MnO_3$ and $LiMO_2$ where M=Co, Ni, $Ni_{0.5}Mn_{0.5}$, or Mn. In such a solid solution used as a cathode active material, Li and O are released from a crystal structure thereof at a high voltage of 4.5 V and thus the solid solution exhibits electrochemical activity. However, there are high possibilities of decomposition of an electrolyte at high voltage and generation of gases and a large amount of a relatively expensive material such as $LiMO_2$ where M=Co, Ni, $Ni_{0.5}Mn_{0.5}$, or Mn needs to be used and thus such a cathode active material is not in practical use.

On the other hand, $LiNiO_2$-based cathode active materials are relatively inexpensive and exhibit high discharge capacity and thus research into such nickel-based cathode active materials has recently been underway to develop high-capacity batteries. However, crystal structures of these cathode active materials undergo rapid phase transition according to changes in volume caused during charging and discharging cycles and, when exposed to air and moisture, stability of these cathode active materials is rapidly reduced.

Thus, nickel-based lithium transition metal oxides, nickel of which is partially substituted with other transition metals such as manganese, cobalt, and the like, are proposed. These nickel-based lithium transition metal oxides substituted with other metals exhibit relatively excellent cycle characteristics and capacity characteristics at an operating voltage of 4.15 V or less. However, when such nickel-based lithium transition metal oxides operate at a voltage of 4.3 V or higher, problems, such as rapid deterioration of cycle characteristics due to poor structural stability, and the like, have yet to be addressed.

Therefore, there is an urgent need to develop a cathode active material that exhibits high capacity characteristics and addresses structural stability problems.

DISCLOSURE

Technical Problem

Therefore, the present invention has been made to solve the above and other technical problems that have yet to be resolved.

As a result of a variety of extensive and intensive studies and experiments, the inventors of the present invention confirmed that, as described below, when a cathode active material for secondary batteries includes a lithium transition metal oxide represented by a particular chemical formula in which a $Li_2MnO_3$-like structure phase is present, the cathode active material may exhibit high capacity characteristics and secure structural stability at high voltage, thus completing the present invention.

Technical Solution

In accordance with one aspect of the present invention, provided is a cathode active material for lithium secondary batteries that includes a lithium transition metal oxide having a lithium molar fraction of greater than 1, containing a relative excess of nickel, and having a composition represented by Formula 1 below, in which the lithium transition metal oxide has a $Li_2MnO_3$-like structure phase.

$$Li_{1+a}Ni_bCo_cMn_{1-(a+b+c+d)}M_dO_{2-t}A_t \qquad (1)$$

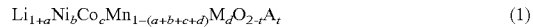

In Formula 1, $0.05 \le a \le 0.2$, $0.4 \le b \le 0.7$, $0.1 \le c \le 0.4$, $0 \le d \le 0.1$, and $0 \le t < 0.2$;

M is at least one divalent or trivalent metal; and

A is at least one monovalent or divalent anion.

In general, conventional cathode active materials containing a large amount of Ni have a layered crystal structure and thus charging and discharging are performed while lithium ions are intercalated into or deintercalated from MO layers. Thus, when lithium ions are deintercalated from a reversible lithium layer in a charged state, a crystal structure of such a cathode active material expands due to repulsive force between oxygen atoms of an MO layer and becomes unstable and, accordingly, the crystal structure is changed by repeated charging and discharging processes and, as a result, capacity and cycle characteristics are rapidly deteriorated. Moreover, such phenomenon is more severe when a secondary battery operates at a high voltage of 4.3 V or higher.

Thus, the inventors of the present invention conducted intensive studies and various experiments and confirmed that a cathode active material containing an excess of Ni and having a lithium molar fraction of greater than 1 has a higher capacity than that of an existing overlithiated cathode active material containing a large amount of Mn, e.g., $Li_2MnO_3$ and maintains structural stability even in a voltage range of 4.3 V or higher and thus collapse of a crystal structure due to intercalation and deintercalation of lithium may be prevented. Accordingly, additional collapse due to deintercalation of oxygen does not occur and thus capacity and cycle characteristics of a battery may be significantly enhanced.

That is, the lithium transition metal oxide according to the present invention includes an excess of lithium and thus, although mechanism thereof cannot be clearly explained, the lithium transition metal oxide has a $Li_2MnO_3$-like structure phase that becomes active when a voltage of a cathode is more than 4.4 V and contributes to structural stability of the lithium transition metal oxide at a voltage of 4.4 V or less and thus may maintain a satisfactorily formed layered structure even at a voltage of 4.3 V or higher. Thus, a battery including such a lithium transition metal oxide as a cathode active material may have high capacity and high cycle stability.

Hereinafter, the present invention will be described in more detail.

Since the lithium transition metal oxide of Formula 1 contains an excess of Li, a molar fraction of lithium may be 1.05 to 1.2 ($0.05 \leq a \leq 0.2$), in particular 1.05 to 1.15 ($0.05 \leq a \leq 0.15$) in a range of greater than 1. When the molar fraction of lithium is less than 1.05, it is difficult to achieve desired structural stability at high voltage. On the other hand, when the molar fraction of lithium exceeds 1.2, it is difficult to achieve desired capacity and resistance of the cathode active material increases and, accordingly, output characteristics are deteriorated.

In addition, the lithium transition metal oxide includes an excess of Ni and may thus maximize capacity. In this regard, a molar fraction b of Ni may be 0.4 to 0.7 ($0.4 \leq x \leq 0.7$), in particular 0.45 to 0.6 ($0.45 \leq x \leq 0.6$). When the molar fraction of Ni is less than 0.4, it is difficult to achieve high capacity. On the other hand, when the molar fraction of Ni exceeds 0.7, structural stability in cycles is very low.

Meanwhile, in the lithium transition metal oxide, a molar fraction c of Co may be 0.1 to 0.4 ($0.1 \leq c \leq 0.4$), in particular 0.2 to 0.3 ($0.2 \leq c \leq 0.3$). When the molar fraction of Co is less than 0.1, it is difficult to achieve excellent rate characteristics and high powder density of a battery. On the other hand, when the molar fraction of Co exceeds 0.4, overall raw material costs increase due to a great amount of Co and reversible capacity is decreased to some extent.

In addition, a molar fraction ($1-(a+b+c+d)$) of Mn of the lithium transition metal oxide may, in particular, be 0.1 to 0.2 ($0.1 \leq 1-(a+b+c+d) \leq 0.2$).

In addition, in the lithium transition metal oxide according to the present invention, at least one of transition metals such as Ni, Mn, and Co may be substituted with at least one divalent or trivalent metal (M) within a predetermined range. The metal may, for example, be at least one selected from the group consisting of B, Mg, Al, Ca, Sr, Cr, Cu, Fe, Ti, Y, and Zn.

Such substituted metal has to be included in an amount that does not reduce reversible capacity and enables enhancement of safety, capacity, and overcharge stability of a battery. As defined in Formula 1 above, the amount of the substituted metal may be 10% or less ($d \leq 0.1$), in particular 5% or less ($d \leq 0.05$).

In addition, in the lithium transition metal oxide, an oxygen (O) ion may be substituted with a monovalent or divalent anion (A) within a predetermined range. The anion may, for example, be at least one selected from the group consisting of F, Cl, Br, and S.

Substitution of these anions enables high binding ability with the transition metals and prevents structural transition of the cathode active material, whereby battery lifespan may be enhanced. On the other hand, when a substitution amount of the anion is too high (0.2 molar ratio or greater based on a total of anions), lifespan characteristics may be deteriorated because the compound is unable to maintain a stable structure. Thus, the substitution amount of the anion may be 0 to 0.2 molar ratio, more particularly 0.01 to 0.1 molar ratio, based on a total of anions.

Meanwhile, the cathode active material according to the present invention may include the lithium transition metal oxide of Formula 1 above alone and, in some cases, may further include other lithium-containing transition metal oxides. In the latter case, the amount of the lithium transition metal oxide of Formula 1 above may be 50 wt % or greater based on a total weight of the cathode active material. In particular, the amount of the lithium transition metal oxide of Formula 1 according to the present invention may be 50 wt % to 100 wt % based on the total weight of the cathode active material.

Examples of other lithium-containing transition metal oxides include, but are not limited to, layered compounds such as lithium cobalt oxide ($LiCoO_2$) and lithium nickel oxide ($LiNiO_2$), or compounds substituted with one or more transition metals; lithium manganese oxides having the formula $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-x}M_xO_2$ where M=Co, Mn, Al, Cu, Fe, Mg, B, or Ga, and $0.01 \leq x \leq 0.3$; lithium manganese composite oxides of Formula $LiMn_{2-x}M_xO_2$ where M=Co, Ni, Fe, Cr, Zn, or Ta, and $0.01 \leq x \leq 0.1$), or Formula $Li_2Mn_3MO_8$ where M=Fe, Co, Ni, Cu, or Zn; lithium manganese composite oxides having the formula $LiNi_xMn_{2-x}O_4$ and a spinel structure; $LiMn_2O_4$ in which some of the Li atoms are substituted with alkaline earth metal ions; disulfide compounds; and $Fe_2(MoO_4)_3$.

The present invention also provides a cathode including the cathode active material and a lithium secondary battery including the cathode.

In this regard, an operating voltage of the lithium secondary battery may be 2.5 V to 4.4 V. This indicates that the lithium transition metal oxide of Formula 1 maintains structural stability even in a voltage range of 4.3 V or higher and thus the lithium secondary battery may operate at a high voltage.

The lithium secondary battery includes the cathode, an anode, a separator, and a lithium salt-containing non-aqueous electrolyte.

The cathode is manufactured by, for example, coating, on a cathode current collector, a slurry made of a mixture of the cathode active material according to the present invention, a conductive material, and a binder and drying the coated cathode current collector. As desired, the mixture (electrode mixture) of the cathode active material, a conductive material, a binder, and the like may further include at least one material selected from the group consisting of a viscosity modifier and a filler.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is a component to further enhance conductivity of an electrode active material. The conductive material may be added in an amount of 0.01 to 30 wt % based on the total weight of the electrode mixture. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; carbon derivatives such as carbon nanotubes and fullerene; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to a current collector. The binder is typically added in an amount of 1 to 50 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The viscosity modifier is a component to adjust the viscosity of the electrode mixture so as to facilitate mixing of the electrode mixture and coating thereof on a current collector and may be added in an amount of 30 wt % based on the total weight of the electrode mixture. Examples of the viscosity modifier include, but are not limited to, carboxymethylcellulose and polyvinylidene fluoride. In some cases, the above-described solvent may also act as a viscosity modifier.

The filler is optionally used as an auxiliary component to inhibit electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode is manufactured by coating an anode material on an anode current collector and drying the coated anode current collector. As desired, the anode material may further include the components described above such as a conductive material, a binder, and the like.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, aluminum-cadmium alloys, or the like. As in the cathode current collector, the anode current collector may also have fine irregularities at a surface thereof to enhance adhesion between the anode current collector and an anode active material. In addition, the anode current collector may be used in various forms including films, sheets, foils, nets, porous structures, foams, and non-woven fabrics.

The anode active material may, for example, be carbon and graphite materials such as natural graphite, artificial graphite, expandable graphite, carbon fiber, hard carbon, carbon black, carbon nanotubes, fullerene, and activated carbon; metals alloyable with lithium such as Al, Si, Sn, Ag, Bi, Mg, Zn, In, Ge, Pb, Pd, Pt, Ti, and the like and compounds including these elements; complexes of metals and compounds thereof and complexes of carbon and graphite materials; and lithium-containing nitrides. Among these, a carbon-based active material, a silicon-based active material, a tin-based active material, or a silicon-carbon-based active material may be used. These materials may be used alone or at least two thereof may be used in combination.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as a separator.

The lithium salt-containing non-aqueous electrolyte is composed of a non-aqueous electrolyte and a lithium salt. As the non-aqueous electrolyte, a non-aqueous electrolytic solution, an organic solid electrolyte, an inorganic solid electrolyte, or the like may be used.

For example, the non-aqueous electrolytic solution may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The present invention also provides a battery module including the lithium secondary battery as a unit battery and a battery pack including the battery module.

The battery pack may be used as a power source of devices that require high capacity, long cycle lifespan, and the like, and examples of the devices include, but are not limited to, small devices such as computers, mobile phones, and power tools, and medium and large devices including: electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

Effects of the Invention

As described above, a cathode active material for lithium secondary batteries according to the present invention includes a lithium transition metal oxide represented by a particular chemical formula and having a $Li_2MnO_3$-like structure phase and thus may exhibit high capacity characteristics and maintain structural stability even at high voltage.

Best Mode

Now, the present invention will be described in more detail with reference to the following examples. These examples are provided only for illustration of the present invention and should not be construed as limiting the scope and spirit of the present invention.

EXAMPLE 1

$Li_{1.1}Ni_{0.45}Co_{0.27}Mn_{0.18}O_2$ as a cathode active material, a conductive material, and PVdF as a binder were added in a weight ratio of 92:4:4 (active material:conductive material:binder) to N-methyl-2-pyrrolidone (NMP) as a solvent to prepare a cathode mixture slurry. Subsequently, 95 wt % of artificial graphite as an anode active material, 1.5 wt % of Super-P as a conductive material, and 3.5 wt % of PVdF as a binder were added to NMP as a solvent to prepare an anode mixture slurry. The cathode mixture slurry and the anode mixture slurry were respectively coated onto Al foil and Cu foil, dried, and pressed, thereby completing fabrication of a cathode and an anode.

Thereafter, a porous polyethylene separator was interposed between the cathode and the anode and an electrolyte containing 1M $LiPF_6$ in a mixed carbonate solvent of EC and EMC in a volume ratio of 1:2 was injected thereinto, thereby completing manufacture of a battery.

COMPARATIVE EXAMPLE 1

A battery was manufactured in the same manner as in Example 1, except that $LiNi_{0.5}Co_{0.3}Mn_{0.2}O_2$ was used alone as a cathode active material.

COMPARATIVE EXAMPLE 2

A battery was manufactured in the same manner as in Example 1, except that $LiNi_{1/3}Mn_{1/3}Co_{1/3}O_2$ was used alone as a cathode active material.

EXPERIMENTAL EXAMPLE 1

Initial Charge and Discharge Characteristics

Charge and discharge capacities of each of the batteries manufactured according to Example 1 and Comparative Examples 1 and 2 were measured at a current of 0.1 C. and at a voltage of 2.5 V to 4.4 V using an electrochemical analyzer (Toscat 3100U manufactured by Toyo Systems). Results are shown in Table 1 below.

TABLE 1

| Sample | Initial charge capacity (mAh/g) | Initial discharge capacity (mAh/g) |
| --- | --- | --- |
| Example 1 | 201 | 181 |
| Comparative Example 1 | 202 | 182 |
| Comparative Example 2 | 188 | 169 |

As shown in Table 1 above, it can be confirmed that the battery of Example 1 has lower initial charge and discharge capacities than those of the battery of Comparative Example 1, while having far higher initial charge and discharge capacities than those of the battery of Comparative Example 2.

EXPERIMENTAL EXAMPLE 2

Lifespan Characteristics

Lifespan characteristics of each of the batteries of Example 1 and Comparative Examples 1 and 2 were evaluated by performing 50 charging and discharging cycles at a current of 1.0 C. and at 45° C. Results are shown in Table 2 below.

TABLE 2

|  | Lifespan characteristics 50$^{th}$/1$^{st}$ discharge capacity (%) |
| --- | --- |
| Example 1 | 90 |
| Comparative Example 1 | 85 |
| Comparative Example 2 | 91 |

As shown in Table 2 above, it can be confirmed that the battery of Example 1 exhibits similar lifespan characteristics to those of the battery of Comparative Example 2, while exhibiting superior lifespan characteristics to those of the battery of Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for a lithium secondary battery, consisting of a lithium transition metal oxide having a lithium molar fraction of greater than 1, and having a composition represented by Formula 1 below, $$Li_{1+a}Ni_bCo_cMn_{1-(a+b+c+d)}M_dO_{2-t}A_t \quad (1)$$

wherein $0.05 \le a \le 0.2$, $0.4 \le b \le 0.7$, $0.1 \le c \le 0.4$, $0 \le d \le 0.1$, $0.1 \le 1-(a+b+c+d) \le 0.2$, and $0 \le t \le 0.2$;

M is at least one divalent or trivalent metal; and

A is at least one monovalent or divalent anion.

2. The cathode active material according to claim 1, wherein a molar fraction a of Li of the lithium transition metal oxide satisfies the following condition: $0.05 \le a \le 0.15$.

3. The cathode active material according to claim 1, wherein a molar fraction b of Ni of the lithium transition metal oxide satisfies the following condition: $0.45 \le b \le 0.6$.

4. The cathode active material according to claim 1, wherein a molar fraction c of Co of the lithium transition metal oxide satisfies the following condition: $0.2 < c \le 0.3$.

5. The cathode active material according to claim 1, wherein M is at least one selected from the group consisting of B, Mg, Al, Ca, Sr, Cr, Cu, Fe, Ti, Y, and Zn.

6. The cathode active material according to claim 1, wherein A is at least one selected from the group consisting of F, Cl, Br, and S.

7. The cathode active material according to claim 1, wherein an amount of the lithium transition metal oxide is 50 wt % to 100 wt % based on a total weight of the cathode active material.

8. A cathode comprising the cathode active material according to claim 1.

9. A lithium secondary battery comprising the cathode according to claim 8.

* * * * *